June 20, 1933. G. GODDU ET AL 1,914,416
METHOD AND MACHINE FOR USE IN THE MANUFACTURE OF BOOTS AND SHOES
Filed Feb. 9, 1931 7 Sheets-Sheet 1

Fig.1.

INVENTORS
George Goddu
Lester F. MacDonald
By their Attorney,
Nelson W. Howard June 20, 1933.                G. GODDU ET AL                1,914,416
METHOD AND MACHINE FOR USE IN THE MANUFACTURE OF BOOTS AND SHOES
                Filed Feb. 9, 1931            7 Sheets-Sheet 7

INVENTORS
George Goddu
Lester S. Macdonald
By their Attorney
Nelson W. Howard

Patented June 20, 1933

1,914,416

UNITED STATES PATENT OFFICE

GEORGE GODDU, OF WINCHESTER, AND LESTER S. MACDONALD, OF BEVERLY, MASSACHUSETTS, ASSIGNORS TO UNITED SHOE MACHINERY CORPORATION, OF PATERSON, NEW JERSEY, A CORPORATION OF NEW JERSEY

METHOD AND MACHINE FOR USE IN THE MANUFACTURE OF BOOTS AND SHOES

Application filed February 9, 1931. Serial No. 514,420.

This invention relates to the manufacture of boots and shoes, and particularly to machines for positioning, shaping and fastening the marginal upper material adjacent to the heel-seats of welt shoes. It includes within its scope a novel method of treating this material to conform it to the contour of the last and the insole, which method is herein shown as carried out by the machine of our invention.

In making welt shoes, the upper materials, and under this term we include the heel stiffener or counter, are lasted over the heel-seat end of the insole and permanently tacked down thereon to the line of the heel breast which coincides substantially with the rear end of the channel lip or rib of the insole. From that point forwardly on each side of the shank, the upper materials are lasted against the insole rib and secured in place by temporary fasteners. Thereafter, the shoe is subjected to the operation of the welt sewing machine by which, simultaneously with the attachment of the welt, the marginal edge of the upper material is permanently sewed to the rib of the insole. It is important in the production of a well-shaped shoe that the upper material should be evenly and completely drawn to the contour of the sides of the last and over-wiped accurately to the edge of the insole. The present machine is designed to facilitate and improve the performance of this operation at two points which are critical in the shoe, namely at the juncture of the heel-seat and shank on each side of the shoe. At the rear of this point, it is the practice to in-turn the marginal edge of the upper material and secure it by tacks in a flat condition upon the surface of the insole. In advance of this point, it is important to shape the marginal upper material into conformity with the insole rib and to make a compact upstanding assembly of the various layers of material including the insole rib in order that the welt sewing operation may be accurately performed and also, of course, in order to produce a smooth well-fitting counter in the shoe. It is very desirable that the welt sewer should be able to sew close up to the end tacks in the heel-seat and that he be able to do this without disturbing those tacks. Heretofore, it has been difficult to insert the channel guide of the welting machine in position to start the seam close to the end tacks on one side of the heel-seat or to retain it in position to sew close to the end tacks on the other side because the stiff flange of the counter has not accurately conformed to the required shape at these critical points in the shoe. A conspicuous element in this difficulty is found in the obstinacy with which the flange of the counter resists being shaped or bent on a short radius into an upright position in conforming to the outer angle of the insole and insole rib.

The object of this invention is to remove the difficulties above discussed and in general to facilitate and economize in the manufacture of welt shoes and to secure a better product. To this end, we have devised a machine in which a pulled-over shoe may be supported and spindled in a position convenient for the operator to turn it in all directions in working about the heel-seat with hand pincers to take up accurately the slack in the upper about the heel-seat portion of the shoe. The jack on which the shoe is spindled may include also means for yieldingly maintaining the upper material in place so that, as the operator progresses about the heel-seat, he may retain full advantage of his work.

The machine of our invenion is adapted to operate upon a spindled shoe presented upon such a jack as that just described or upon a shoe in the same stage of manufacture presented by hand. It includes as an important feature an anvil against which the operator may position the insole rib adjacent to that point at which the marginal upper material is to be operated upon. Preferably, the anvil normally occupies an inoperative position and may be rendered operative by preliminary movement of the treadle, which may be relied upon also to set the power mechanism of the machine in operation. The anvil, as will be understood, has the important function of supporting the insole rib at its inner face so that it will not be deformed by the pressure exerted against it in molding or shaping the marginal upper material to the contour of its outer face.

In accordance with an important feature of the invention, a creasing or counter-breaking tool is provided which acts in cooperation with the anvil to compact into an upstanding assembly the insole rib and the marginal upper material, including the leather, lining and counter, and this operation is effected preferably after a preliminary overwiping action has been imparted to the marginal upper material in presenting the shoe in operative position to the machine. The preliminary compacting and forming of the marginal upper material, as above outlined, is of great assistance in automatically carrying out two ensuing operations, viz., the severing of the material at the most advantageous point and the breaking of the stiff margin of the counter into an angle fitting the contour of the insole rib. To accomplish these results, the machine of our invention is equipped with an over-wiping member which is arranged to move inwardly over the insole bottom and cooperate with the anvil to shear the marginal upper material at exactly the point which is to be the juncture between the heel-seat and the shank portion of the shoe. Having severed the material, the wiping member proceeds to lay smoothly and overwipe the severed portion thereof upon the surface of the insole. Thereafter, the counter-breaking tool is actuated to increase its pressure against the unsevered and upstanding portion of the marginal material so as to mold or shape it into a compacted upstanding rib well adapted for the welting operation. It is believed that an inwardly-moving cutter has not been heretofore employed to sever an upstanding assembly of marginal upper material upon an insole. A cutter of this character is particularly desirable because it may be operated without danger of cutting the insole or of distorting the insole rib. Such a cutter, accordingly, constitutes a valuable feature of our invention whether or not it is adapted for further functions.

We have found that the margin of the counter may be satisfactorily broken or molded to the desired shape by first subjecting it to a yielding pressure and then breaking it by the impact of a suitably-shaped tool so as to form an abrupt crease or angle corresponding to the outer contour of the insole rib. The machine herein shown presents one form of mechanism by which this novel method of shaping a counter stiffener may be carried out, but it will be understood that other and different instrumentalities may be employed for carrying out the steps of the method.

It is desirable to secure the severed and over-wiped portion of the upper material in position upon the insole and, accordingly, another feature of our invention consists in a tacking nozzle arranged to be properly positioned thereon at the conclusion of the over-wiping operation. In accordance with still another important feature of our invention, we combine in one element the over-wiping, the cutting and the tack-positioning instrumentalities of the machine. This is accomplished by providing the tacking nozzle with an over-wiping surface and with a shearing edge, with the result that by imparting the proper movement to this element all three functions are carried out in their proper sequence.

Other important features of our invention consist more particularly in the novel mechanical construction and organization of the various mechanisms and elements of the machine, their cooperative and supplementary operation and their compact and effective arrangement and actuation.

These and other features of the invention will be best understood and appreciated from the following description of a preferred embodiment thereof, selected for purposes of illustration and shown in the accompanying drawings, in which.

The illustrated machine comprises a main frame 10 which is shaped to enclose the motor driving the machine and to support the moving parts. The base of the frame comprises a casing of sufficient size to contain the motor and to carry the jack and treadle mechanism. The frame includes also an intermediate column portion and a head portion containing a shaft driven by a belt from the motor and supporting the operating instrumentalities of the machine.

The jack and its associated parts for supporting and positioning the shoe in its presentation to the machine will first be described. These parts are suspended on a fixed horizontal shaft or stud 12 projecting outwardly and toward the right from a boss 13 formed in the lower part of the frame 10. A carrier block 15 is mounted for free oscillation on the stud 12 and is held in place thereon by a headed retaining screw 14. At its lower side the block 15 is provided with a boss having a horizontal bore extending at right angles to the axis of the stud 12 and in the bore is mounted a pin 16 upon which are swiveled the arms of an inverted yoke member 17, which constitutes the lower end of the tubular jack casing 18. It will be understood, therefore, that the jack as a whole may be rocked inwardly and outwardly of the machine about the axis of the fixed stud 12 and may be rocked from side to side about the axis of the pin 16. The universal adjustment thus provided is limited by a stationary loop member 19 secured to the frame and encircling the lower portion of the jack casing 18.

Within the casing 18 is mounted the jack post 20, freely rotatable about a vertical axis and resting upon a block 21 carrying a pair of horizontally disposed rolls 22 which project outwardly through slots in the sides of the casing 18. The jack post is lifted in the casing by a forked wedge cam 31 which straddles the casing and engages one of the rolls 22 at each side thereof. The forked cam 31 at its rear end is pivotally connected to a curved lever 23 having a fulcrum pin 24 which is carried by an arm 25 projecting downwardly and rearwardly from the rear arm of the yoke member 17. The curved lever 23 is provided with a counterweight 26 so that it tends at all times to swing in a clockwise direction and position the small end of the wedge cam 31 beneath the rolls 22.

Figure 2:
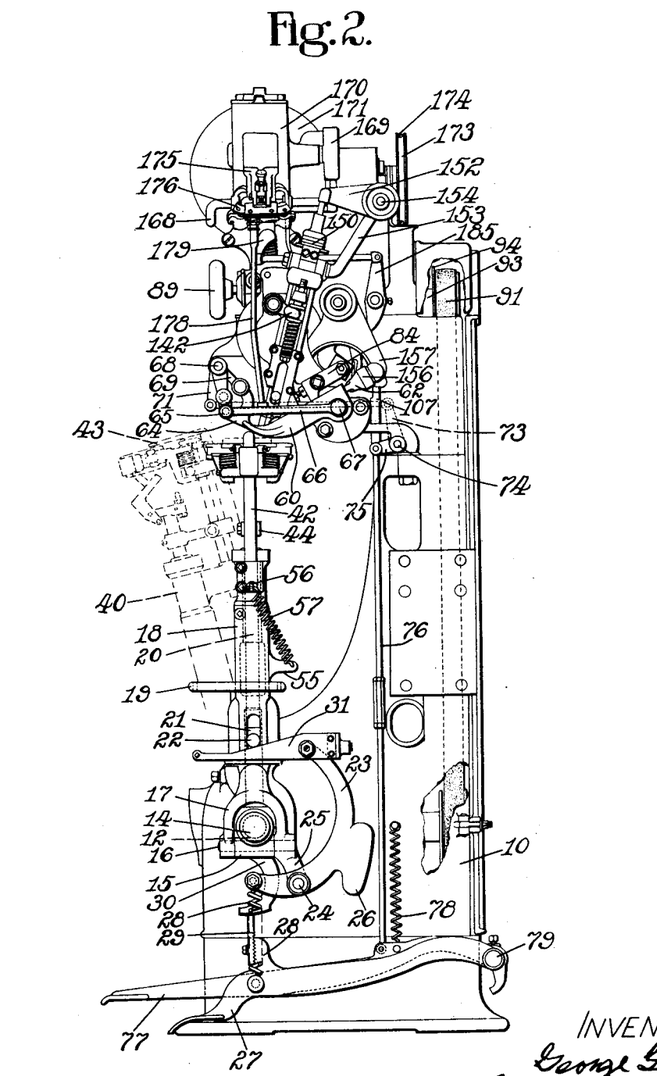
Fig. 2 is a similar view in side elevation.

The lever 23 is swung in a counter clockwise direction to advance the wedge cam by the depression of a treadle 27, to which it is connected by means of a tension spring 28. The treadle 27 is pivoted to the back of the machine frame 10 and is provided with an upstanding arm or lug 28, to which is adjustably bolted a stop piece 29. This is arranged to contact with an abutment arm 30 projecting downwardly from the block 15, which carries the jack. The lower face of the abutment arm is curved on a radius concentric with the axis of the stud 12 and serves to prevent elevation of the treadle 27 and consequent retraction of the wedge cam while the jack is in its vertical and operative position. On the other hand, when the jack is swung forwardly into its initial or work-receiving position, as indicated by dotted lines in Fig. 2, the abutment arm is carried to the rear of the stop piece 29, so that the counterweight 26 is effective in retracting the cam 31 and elevating the treadle 27. It will be noted that the forward movement of the cam 31 in elevating the jack is variable, depending upon the thickness of the work upon the jack, as will presently be described, but that the treadle 27 may be at all times depressed to the floor, as shown in Fig. 2, lost motion between the two being taken up in the elongation of the spring 28. It will be noticed also that the cam-operating lever 23 is carried bodily by the yoke member 17, so that when the jack is rocked in either direction the assembly is not disturbed and there is no interruption of the effective connection between the cam 31 and the treadle 27.

The jack post 20 carries near its upper end a head 32 upon which is mounted a last bed piece 33 having the usual last pin in its upper face and being pivotally mounted for movement about a horizontal axis. The last bed piece has a downwardly-extending arm through which its fulcrum pin extends, and a tension spring 35 extending between the lower end of this arm and the head 32 of the jack post tends normally to tilt the last bed piece into a forwardly-inclined position so that presentation of the shoe at a convenient angle is facilitated. A rigid but adjustable stop screw 36 serves to determine the operative position of the last bed piece when the latter is swung into working position by the operator in locating the shoe.

The jack casing 18 carries near its upper end a freely rotatable sleeve 40 mounted on ball bearings and carrying an outwardly-extending arm 41 from which projects a rigid upright shaft 42. The shaft 42 has at its upper end an inwardly-extending horizontal arm 43 which constitutes a positive stop or height gauge for determining the vertical position of the sole of a shoe on the jack when the shoe is lifted by the advancing movement of the wedge cam 31. The gauge 43, it will be remarked, is fixed in vertical relation to the jack casing 18 and moved bodily with the latter when it is tilted outwardly into shoe-receiving position, as shown in Fig. 2.

The jack post 20 has adjustably secured thereto an outwardly-extending bracket arm 44 forked at its outer end to embrace the shaft 42 and carrying a vertical rod 45. The rod 45 carries at its upper end a head 46 which is provided with a vertical bore through which the shaft 42 extends and which permits the head to slide freely thereon when the rod 45 is lifted with the jack. At either side the head 46 is forked and carries a vertical pivot pin 47 upon which is mounted a clamp arm 48. Each of the clamp arms 48 is also forked to engage the arms of the head 46 and a torsion spring 49 surrounds each pivot pin 47 in the space between the forks of the clamp arm and tends to swing the two clamp arms inwardly into clamping relation with a shoe supported on the last bed piece. Inward movement of each clamp arm under the actuation of its spring 49 is limited by a stop screw 50 threaded into a boss on the head 46 and arranged to engage a lug on the clamp arm.

Each clamp arm at its inner end carries a self-adjusting rocker member 51 pivotally mounted upon a vertical pivot pin 52 and free to swing to accommodate itself to the shoe within limits permitted by a pin 53 and slot connection with the clamp arm 48 which carries it. The inner face of each rocker member is provided with a pad 54 of leather or other yielding material.

It will be noted by reference to Fig. 2 that the jack normally occupies a forwardly-inclined position with the last bed piece also tilted forwardly. The operator presents a lasted shoe to the jack with the parts in the dotted line position shown in Fig. 2 and then lifts the toe thereof, swinging the bed last piece against its stop and wiping the sides of the counter portion of the upper upwardly on the last by its movement between the yielding pads 54 of the clamp arms 48. The lasted shoe when once positioned upon the jack is held firmly in position by these pads and may be moved vertically upwardly by depression of the treadle 27 until it is arrested by the engagement of the sole with the under face of the height gauge 43. When the shoe has been thus presented and jacked, the operator may conveniently pull up the sides of the counter with hand pincers so as to fit the upper snugly to the counter of the last, and whatever material is secured in this operation is held firmly in place by the operation of the clamp arms and their pads 54.

The jack post 20 and all the shoe-positioning parts are free to swivel about the axis of the casing 18 so that in pulling up and smoothing the counter portion of the upper the operator may swing the shoe from side to side to secure the most convenient conditions. A tension spring 57 extending between a rearwardly-extending arm 55 of the jack casing 18 and a stud 56 projecting from the arm 41 of the sleeve 40 tends normally to turn the jack into the dotted line position shown in Fig. 2 in anticipation of the presentation of the shoe. In swinging the shoe from side to side, the spring 57 is stretched by the action of the operator but tends, when permitted to do so, to return the jack always to its initial position. As shown in the full line position in Fig. 2, the operator has swung the toe of the shoe toward his left hand so that the heel portion thereof would face the observer.

The description thus far has included those parts of the machine which are associated with the jack and are supported upon the base portion of the frame. Passing now to the head of the machine, it will be noted that in being swung inwardly to operative position upon the jack the lasted shoe first encounters a downwardly and outwardly-inclined guide member 60 which is rigidly secured to the machine head and rounded or curved at its free end so that the shoe may readily slip into position beneath it with an ironing action. The guide member is bifurcated at its end, as shown in Fig. 5, and provided with an internal guideway for a forked rib-clamping slide member 62, which will be presently described in more detail.

Oppositely-disposed with respect to the stationary guide member 60 is a pivotally-mounted rib-clamping and shoe-positioning anvil 64 also forked at its work-engaging end. The anvil, as best shown in Fig. 5, is suspended by a stud 65 which extends transversely between the outer ends of a pair of substantially horizontal links 66 pivotally connected to the head frame 10 by studs 67. The stud 65 also extends through the lower end of a short link 63 which, in turn, is connected to the head frame by a longer arm 61, the link 63 and the arm 61 constituting a toggle which, when straightened, positions the anvil 64 and when broken controls its movement, as will presently appear. The anvil 64 has an upwardly-extending arm which is pivotally connected to the lower end of an arm 69 keyed to a transverse shaft 68 journaled in the machine head. The arm 61 is also keyed to this shaft and it will be apparent that when it is rocked in a counter-clockwise direction the rib-engaging end of the anvil will be moved upwardly and toward the left, as seen in Fig. 3, to an inoperative position out of contact with the shoe.

Figure 1:
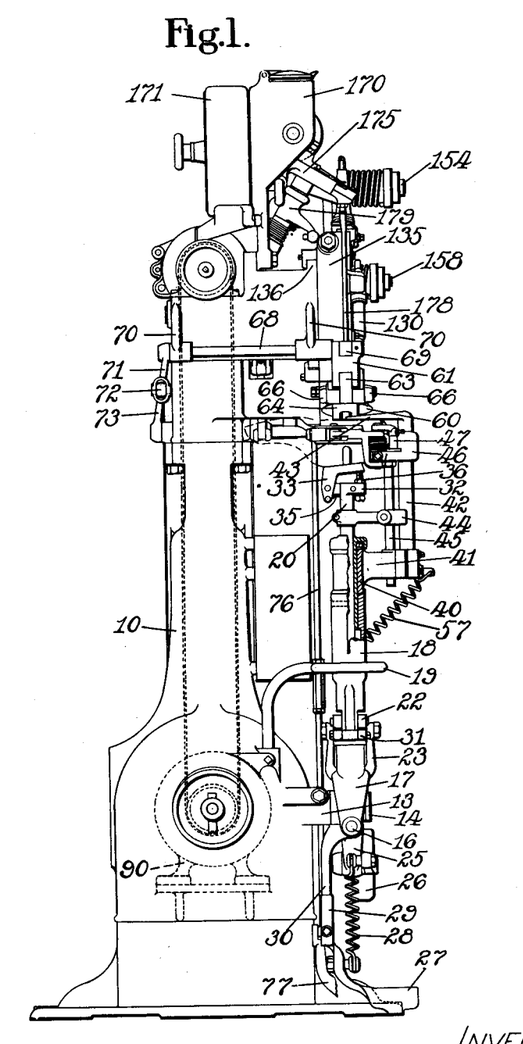
Fig. 1 is a view of the machine in front elevation.

The shaft 68 is journalled in brackets or lugs on the left side of the machine head, as seen in Fig. 1, and extends to the rear of the head where it is provided with a downwardly-extending arm 71. The arm 71, in turn, is connected through a horizontally-disposed rod 72 to an arm 73 on the rear end of a forwardly-extending shaft 74 journaled in the machine head and carrying at its forward end a forked lever 75 to one arm of which is connected a treadle rod 76. The treadle rod is adjustable in length and is connected at its lower end to a second treadle 77 normally held in elevated position by a tension spring 78.

Figure 3:
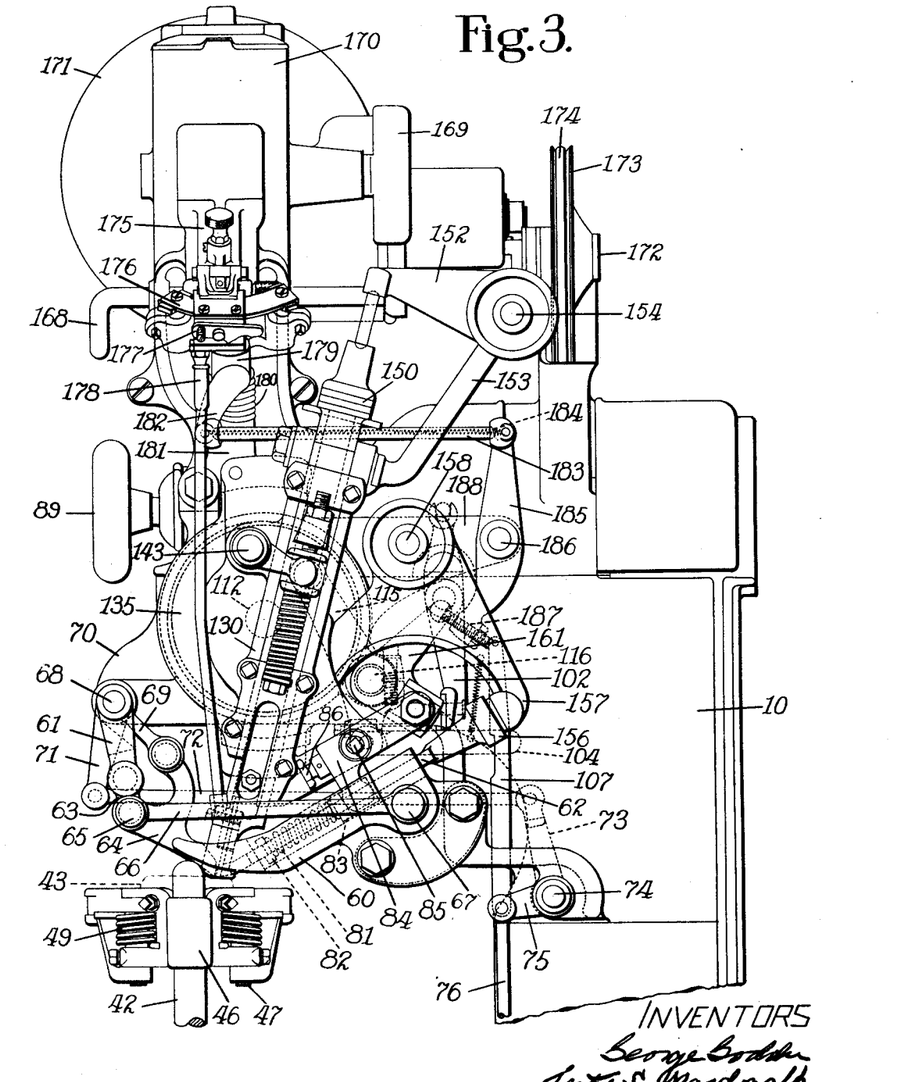
Fig. 3 is a view in side elevation, on an enlarged scale, of the head of the machine.
Figures 5, 11, 12:
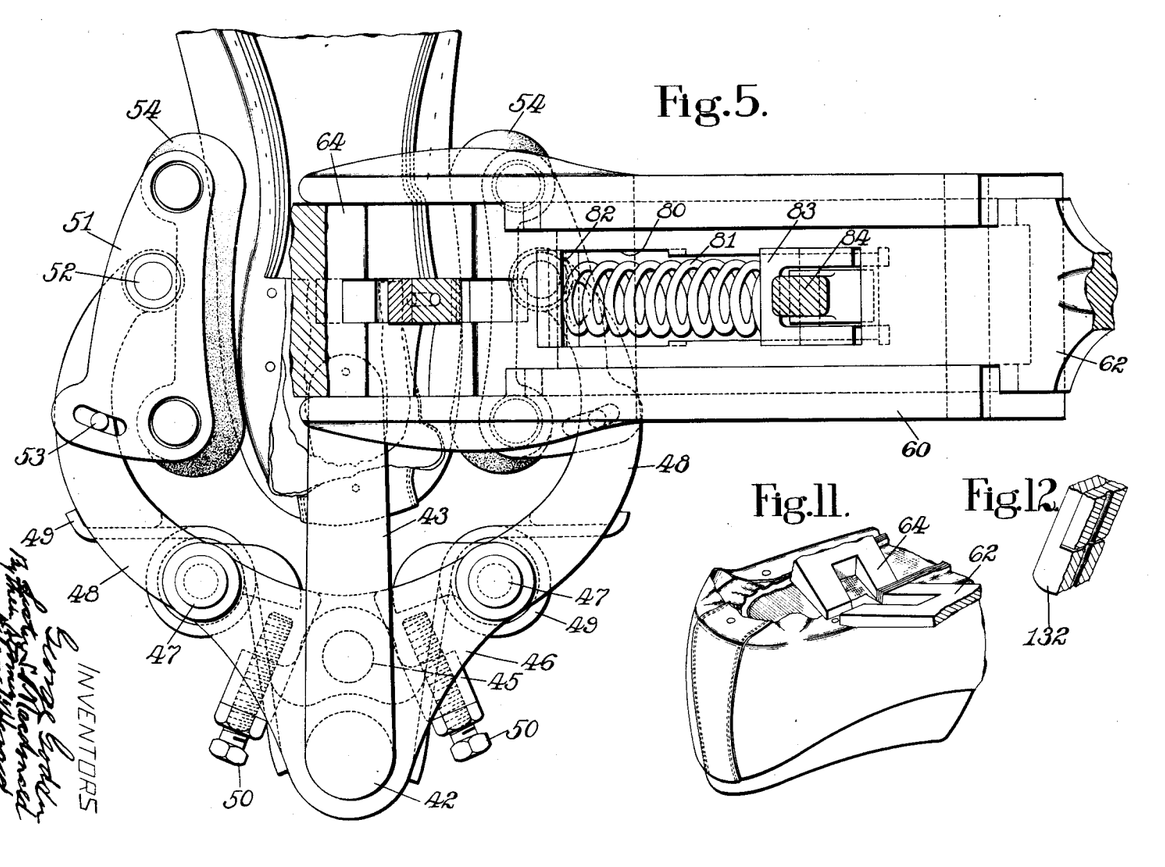
Fig. 5 is a plan view, partly in section on an enlarged scale, of the jack top and associated parts, showing a shoe in working position.
Fig. 11 is a view in perspective illustrating the operation of the anvil and counter-breaking or creasing tool upon a shoe.
Fig. 12 is a fragmentary detail view of the tack nozzle.
Figures 6, 13:
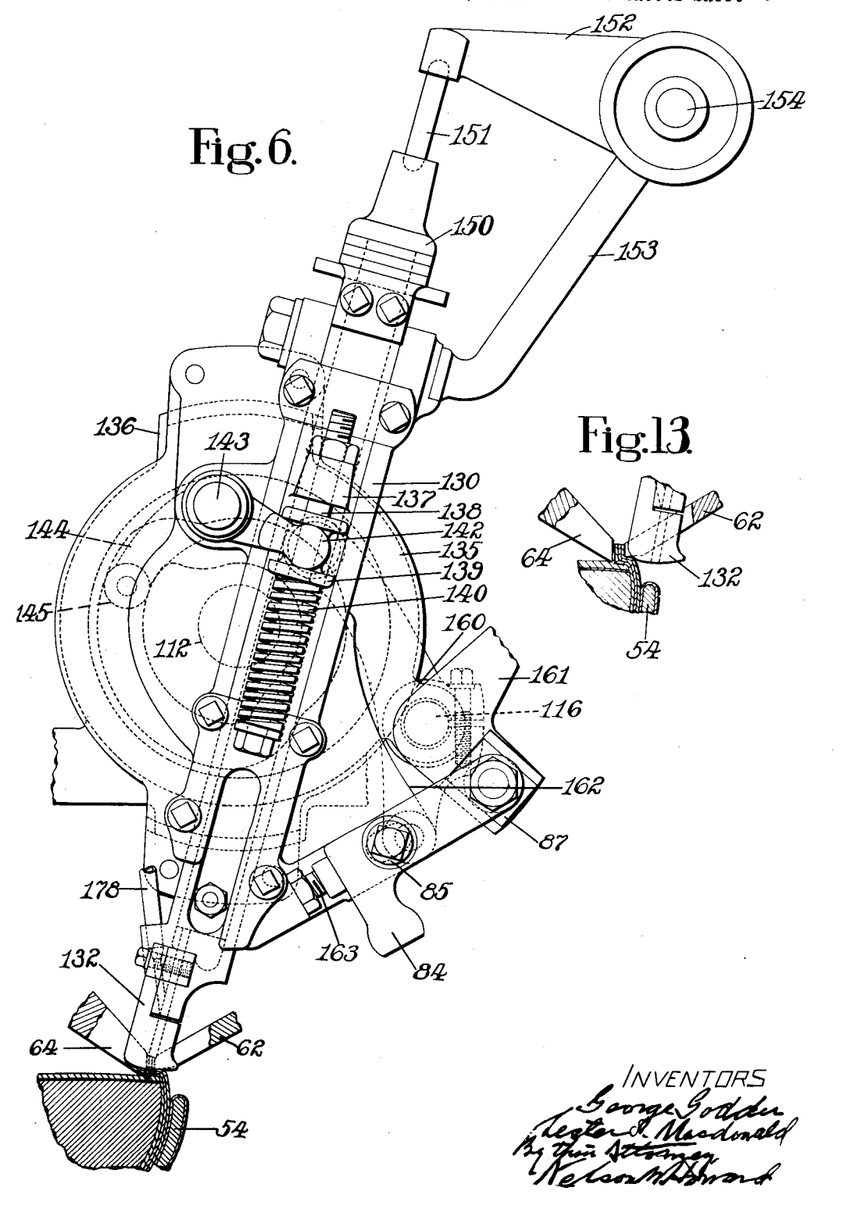
Fig. 6 is a view in elevation of the tack nozzle mechanism.
Fig. 13 is a detail view illustrating the position of the operating instrumentalities of the machine at the working point.

In the drawings the treadle 77 is shown as if depressed by the operator and, consequently, the anvil 64 has, through the train of mechanism above described, been swung downwardly and toward the right, as seen in Figs. 3, 6 and 11, to grip and compress the upstanding margin of the upper and the insole rib between itself and the forked end of the slide 62. In presenting the shoe to the machine, the line on the insole indicating the forward limit of the heel-seat will be located opposite to the inner edge of the forward fork of the anvil 64 and of the slide 62. The rear forks of these members, therefore, have no function in operating upon the right side of the inverted shoe, as in Fig. 11, but when the shoe is reversed to position its other side for treatment the other forks of the gripping members become effective.

The slide member 62 is bifurcated at its lower or work-engaging end, as shown in Fig. 5, having transverse end edges of such contour as to shape the marginal upper material, including the counter, and the insole rib into a compact upstanding rib between the said end edges and the corresponding edges of the anvil 64. The opening between the forks of the slide 62 exactly registers with the opening between the forks of the anvil 64 and the combined tack nozzle and cutter 132 is arranged to move in the space there provided, as will be presently explained.

The slide member 62 is provided with an interior rectangular slot 80 in which is disposed a heavy compression spring 81 acting at its lower end through a bearing block 82 upon the slide to urge it forwardly and at its upper end against a sliding saddle 83 guided in the member 62 and held at all times in contact with the downwardly-extending arm of an adjustable angle piece 84. The arm itself engages the upper edge of the slot 80 and thus positively limits the outward movement of the slide member 62 under the actuation of the spring 81, at the same time leaving the slide member free to yield inwardly when the anvil 64 is brought into operative position by the depression of the treadle rod 76. It will be understood that in positioning the anvil 64 the treadle is fully depressed and the toggles which support it are both straightened so that the anvil 64 is positively positioned and locked in operative position and thereafter cooperates as a fixed member with slide member 62 and with the tack nozzle 132, both of which, after the upper material has been gripped as above explained, are given further automatic movements.

The operations discussed up to this point are effected by the operator in depressing the jack treadle 27 and the treadle 77 without the assistance of power but as the ensuing operations are automatic in their character, the power-operated mechanism of the machine will now be described.

Figure 7:
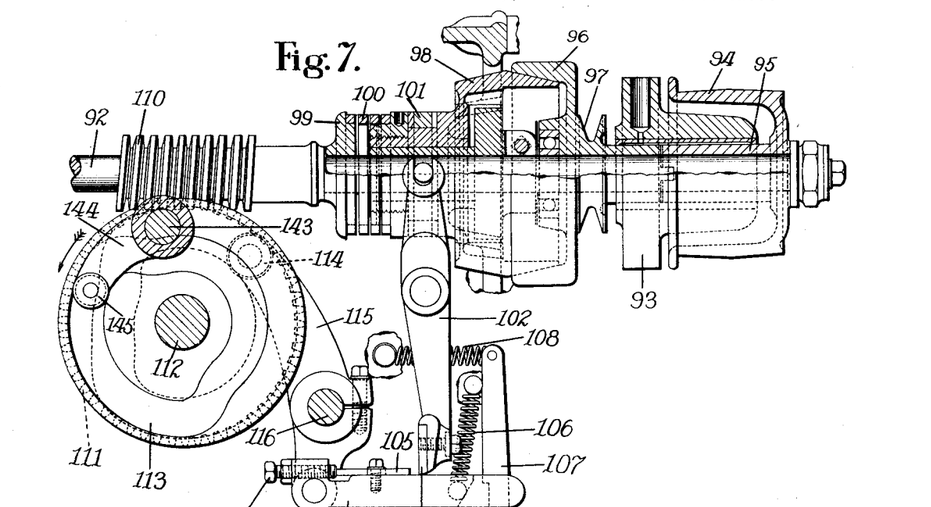
Fig. 7 is a view in elevation, partly in section, of the main head shaft of the machine including the starting and stopping mechanism.

As already stated, the driving motor 90 is housed in the base of the machine frame. It is connected through a vertical belt 91 to a pulley 94 journaled upon a driven shaft 92 mounted in bearings in the head frame, one of which bearings 93 is shown in Fig. 7. The pulley 94 is secured to or formed integral with a sleeve 95 which constitutes the hub of a female or concave clutch member 96. A grooved pulley 97 is also formed in this member which, it will be understood, rotates idly upon the shaft 92 whenever the motor is operating.

The convex or cone member 98 of the clutch is keyed upon the shaft 92 and arranged for longitudinal movement into and out of engagement with the concave clutch member 96. A compression spring 100 interposed between the clutch cone 98 and a fixed collar 99 on a shaft 92 acts normally to urge the clutch cone into engagement and, accordingly, to set the shaft 92 in rotation. Upon the hub of the clutch cone is provided a shipper ring 101 having trunnions by which it is connected to a vertically-disposed shipper lever 102. At its lower end the shipper lever is provided with a wear piece 103 which cooperates with a plate 105 adjustably mounted upon a latch arm 104. The plate 105 may be longitudinally adjusted on the latch arm 104 by means of an adjusting screw 109 and may be secured in adjusted position by a clamping bolt. The latch arm is normally raised by a tension spring 106 and when the machine is at rest the shipper lever 102 is held against movement by its engagement with the latch plate 105 and the clutch is maintained in disengaged condition. The latch arm 104 is arranged to be depressed from the starting treadle 77 and to this end a vertically-disposed tripping rod 107 is connected to one arm of the forked lever 75 already referred to as being operated by the treadle rod 76. The tripping rod is normally pulled toward the left, as shown in Fig. 7, into a position in which it engages a shoulder upon the latch arm 104. The result is that when the tripping rod is moved downwardly it swings the latch arm 104 sufficiently to let the wear piece 103 on the shipper lever slip out of engagement with the latch plate 105 and move its lower end toward the left, permitting the clutch to engage under the actuation of the compression spring 100 and the shaft 92 to rotate.

The shaft 92 is provided with a worm 110 meshing with a worm wheel 111 fast to a transverse shaft 112 journaled in the head frame of the machine. Fast to the shaft 112 is a cam disk 113 (see Fig. 7) having a cam track cut in each of its opposite faces. The latch arm 104 is pivotally mounted in the lower end of a cam lever 115 fast to a shaft 116 disposed in parallel relation to the cam shaft 112. At its upper end the cam lever 115 carries a cam roll 114 which runs in the cam track in the rear face of the cam disk 113. This cam track is so shaped as to swing the cam lever 115 in a clockwise direction immediately after the shaft 92 is set in operation. In this movement the latch arm 104 is carried toward the left and the latch plate 105 is thus temporarily held out of contact with the wear piece 103 on the shipper lever 102. This is the position of the parts as shown in Fig. 7 and it will be apparent that rotation of the shaft 92 continues until the cam lever 115 is rocked in a counter clockwise direction, whereupon the latch plate 105 acts to swing the shipper lever in the same direction and disengages the clutch. From the foregoing description it will be seen that the shaft 112 thus operates as a one-revolution shaft, being driven at a ratio of perhaps 1 to 28 with respect to the shaft 92 and making one complete revolution for each depression of the starting treadle. At its forward end the shaft 92 is provided with a small hand wheel 89 by which it may be manually turned.

The description has now carried the power-operated train of mechanism to the shaft 112 and the cam disk 113. We shall now pass to the tack driving mechanism and its associated parts and then complete the description of the connections of the power train with these parts.

The tacking mechanism includes an elongated casing 130 in which is telescopically contained the tack nozzle 132 and the driver bar 134. The casing 130 is formed as a part of a circular cover plate 135 mounted to oscillate upon circular gibs 136 formed as a part of the head frame and concentric with the shaft 112, already mentioned. The tack nozzle is an elongated member and is formed at its lower end with a wiping surface, as shown in Figs. 6 and 13. It is arranged yieldingly to engage the marginal upper material of the shoe and to wipe it inwardly over the upper surface of the insole. It is also hardened and provided with shearing edges which co-operate with the inner edges of the forks of the anvil 64 when the nozzle is moved inwardly. Near its upper end the tack nozzle is provided with an outwardly-extending boss 137 which projects through a slot in the face of the casing 130 and through which projects the upper end of a bolt 138. The bolt 138 projects downwardly through a loose sleeve 139 and is encircled throughout the lower portion of its length by a compression spring 140 which bears against the head of the bolt and constitutes a yielding connection between it and the sleeve 139. The sleeve 139 is flanged to receive the rounded end of a lever arm 142 fast to a short shaft 143 which is journaled in the cover plate 135 and provided at its inner end with a cam arm 144 having a cam roll 145 which runs in the cam track which is formed in the forward face of the cam disk 113. This cam track is shaped to depress the nozzle 132 through the yielding connections above described into engagement with the work when the shaft 92 is set in motion to hold it in yielding engagement with the marginal upper material during its initial wiping movement, and to elevate it during its outward movement in the final portion of the machine cycle so that it shall not disturb the over-wiped upper material in its outward movement.

The driver bar 134 carries a driver at its lower end which works in the nozzle 132 and extends at its upper end out from the casing 130, being provided with a head 150 which is connected through a strut member 151 to an actuating lever 152. The lever 152 is pivotally mounted upon the upper end of a bracket arm 153 which is secured to the upper end of the casing 130 and furnishes bearings for a spindle 154 which is encircled by a torsion spring 155 acting at all times to swing the actuating lever 152 powerfully in a counter clockwise direction, as seen in Fig. 6. The driver bar 134 is also provided with a rearwardly-extending tooth 14. by which it is elevated in opposition to the spring 155 until, at a predetermined point in its travel, it is released and driven down by the spring to insert the tack previously delivered to the tack nozzle.

Figures 8, 9:
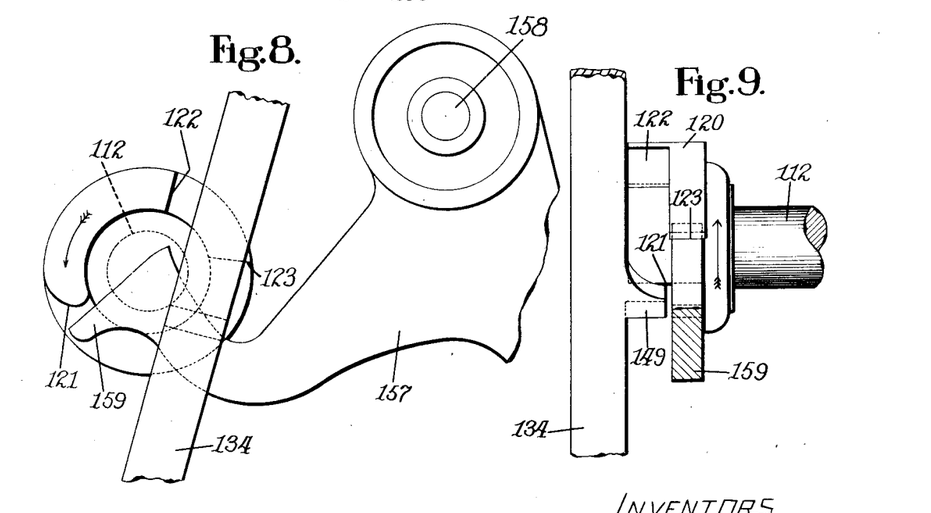
Figs. 8 and 9 are detail views, on an enlarged scale, of the driver bar actuating mechanism and associated parts.
Figure 10:
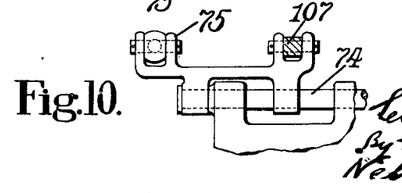
Fig. 10 is a detail view of the starting treadle lever mounting.

A spring-actuated lever is also provided for operating the slide member 62 in a somewhat similar manner and this will now be described. The slide member 62 is provided at its outer end with a head 156 which is arranged to be engaged by one arm of a forked lever 157 pivotally mounted upon a spindle 158 projecting from the side of the head frame and encircled by a torsion spring 159 which tends at all times to swing the lever in a clockwise direction. The other arm of the lever 157 is provided with a cam follower 159 and extends into a position adjacent to the tooth 149 of the driver bar. The shaft 112 is provided at its forward end with a circular drop-off cam 120 having an axially-extending cam surface 121 of sufficient width to engage the cam follower portion 159 of the lever 157 and also the tooth 149 of the driver bar 134 so that in the rotation of the cam the lever 157 is rocked in a counter clockwise direction and the driver bar 134 is elevated. The cam 120 is provided with two drop-off points or shoulders, as shown in Figs. 8 and 9. The shoulder 122, which is approximately 60° behind the cam surface 121, is first rotated to a position in which it releases the tooth 149, allowing the driver bar 134 to make its driving stroke under the actuation of the spring lever 152. In the continued rotation of the cam the second drop-off shoulder 123, which is approximately 190° behind the cam surface 121, next reaches a position wherein it releases the lever 157, allowing it to be swung powerfully in a clockwise direction to drive the slide 62 downwardly and strike a blow against the upstanding rib of marginal upper material, thus ensuring that the stiff margin of the counter shall be broken into a vertex and creased into the outer angle of the insole rib. As shown in Fig. 9, the drop-off shoulder 122 is offset axially or laterally with respect to the drop-off shoulder 123 and the cam follower 159 and tooth 149 of the driver bar are correspondingly arranged so that the operations above explained take place independently of each other and without interference of the parts.

Rocking motion is imparted to the cap plate 135 and the tacking mechanism which it carries by means which will now be described. The head frame is provided with a rearwardly-extending boss 160 in which the shaft 116 is journaled and this shaft at its forward end is formed integral with a bell crank lever 161. The lower arm of this lever 161 is provided with guide flanges between which is received the block 87 above described as being pivotally mounted in the end of the angle piece 84. The angle piece 84 is rigidly but adjustably secured to an outwardly-extending flange 162 on the cover plate 135. It is provided with a clamping bolt 85 and rests at its lower end on a screw 163 which is threaded into a boss on the lower end of the casing 130. The angle piece is longitudinally slotted and may be accurately adjusted by turning the screw 163 and then clamped in adjusted position. The shaft 116, as already explained, is oscillated by the cam lever 115 and in this movement the bell crank lever 161 is rocked first in a clockwise direction to swing the casing inwardly with respect to the shoe and effect the over-wiping and shearing operations, and then reversely to return the tack nozzle to initial position. It will be seen that in this movement the downwardly-extending arm of the angle piece 84 is first moved to permit the slide 62 to advance under yielding pressure against the upstanding rib of marginal upper material, in which position it is free to make its further final movement under the actuation of the spring lever 157, and then it positively retracts the slide.

The final or driving position of the tack nozzle 132 is thus determined by the adjustment of the angle piece 84. By increasing its effective length the nozzle is carried further inwardly from the edge of the insole, whereas by decreasing its effective length the tack is located near to the edge. As will be plain from what has already been said, the nozzle acts in its inward movement as a cutter to shear the compacted rib of upper material against one of the inner corners of the anvil 64 and to wipe the severed portion of the material down upon the surface of the insole.

The machine is provided with assorting and delivering mechanism for supplying a tack to the nozzle 132 near the end of each machine cycle in readiness to be driven into the severed and in-turned material. This mechanism will now be described.

Figure 4:
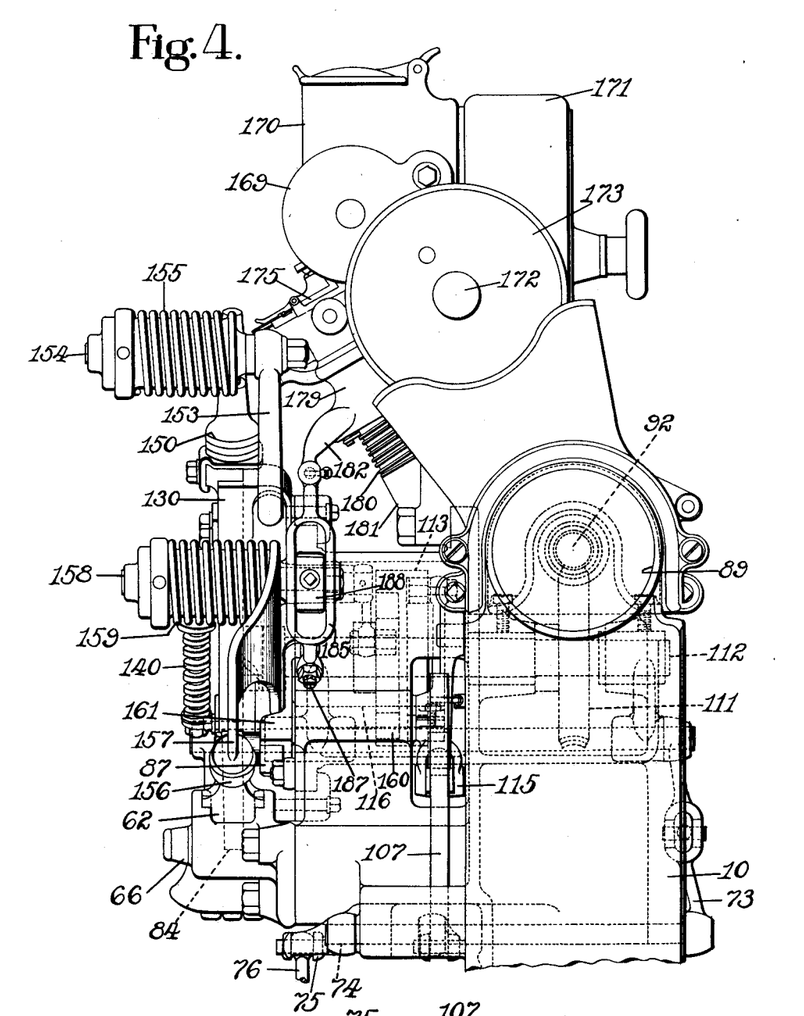
Fig. 4 is a similar view of the head looking from the right.

The tack-supplying mechanism is substantially of the construction disclosed in U. S. Letters Patent No. 1,772,287, granted July 30, 1929 on an application of Goddu and MacKenzie, to which reference may be had for details of construction not herein specifically described. This mechanism includes a tack pot 170 associated with which is a drum 171, both being mounted on the upper part of the head frame of the machine. The drum 171 and the tack pot mechanism in general are driven from the grooved pulley 97 on the shaft 92, shown in Fig. 7, through a round belt 174 and a pulley 173 fast upon a shaft 172 journaled in the upper part of the head frame. The shaft 172 has connections, not shown with the drum 171 by which the latter is rotated to pick up the tacks contained promiscuously in mass therein and drop them upon a raceway 175 which projects outwardly and downwardly from the tack pot 170. A clearing wheel of the usual construction is provided above the raceway and this is driven by a gear train from the shaft 172, the casing 169 of one of the gears being shown in Figs. 3 and 4. The gear train includes a clutch which is controlled by a bent rod 168 and this may be moved to disengage the clutch and stop the rotation of the clearing wheel whenever it is desired to do so. A latch piece 177 is provided at the lower end of the raceway for retaining the tack block in place.

The tack pot and its associated mechanism maintains a line of tacks in the raceway 175 and a curved separator plate 176 is provided for separating the lowermost tack in the line and discharging it through a flexible tube 178 to the tack nozzle 132 at the proper time in the machine cycle. The separator plate 176 is curved and secured to a pair of arms extending upwardly from a sleeve 179 arranged to oscillate upon a forwardly and upwardly-inclined spindle 181 mounted in the head frame. A torsion spring 180 tends to move the sleeve 179 and the separator plate always to one limit of its path, that is to say, toward the right, as seen in Fig. 3. Movement of the separator slide in the other direction is effected by a train of mechanism connected to the bell crank lever 161 which has already been described and which, it will be recalled, is oscillated in a clockwise direction to effect the over-wiping and shearing movement of the tack nozzle. The upwardly-extending arm of the lever 161 is arranged to engage an adjustable abutment screw 187, shown best in Fig. 3, which is carried by the lower end of a vertically-disposed lever 185 journaled upon a stud 186 in a stationary bracket 188 secured to or formed as a part of the head frame. At its upper end the lever 185 is provided with a socket in which is received the right-hand end of a push rod 183 and the left end of the push rod is similarly received in a socket formed in the outer end of the arm 182. The arm 182 and the upper end of the lever 185 are drawn always together by a tension spring 184 which extends between them. It will be apparent from the foregoing description that when the bell crank lever 161 is rocked in a clockwise direction, the lever 185 will be rocked in a counter clockwise direction and the arm 182 moved toward the left in opposition to the torsion spring 180, carrying the separator plate 176 to the left-hand limit of its stroke. Similarly, when the bell crank lever 161 is rocked in the reverse direction, the separator plate 176 moves toward the right under spring actuation and in this movement releases the endmost tack, which at once drops through the flexible tube 178 into the tack nozzle. This occurs late in the cycle of the machine, the tack being deposited in readiness for use in the succeeding cycle.

The operation of the machine will be apparent from the foregoing description but for convenience may be summarized as follows. The operator will place the pulled-over shoe in inverted position upon the jack while the latter occupies its outwardly-inclined initial position, as shown in dotted lines in Fig. 2, the pads 54 yieldingly engaging the upper material and pressing it against the counter portion of the last. The operator will then swing the jack rearwardly into its upright position, as shown in Fig. 2, and upon depressing the treadle 27 the jack post will be lifted until the shoe bottom encounters the height gage 43. In swinging the jack inwardly, the abutment arm 30 is moved over the stop piece 29, holding the treadle down and, consequently, maintaining the shoe in its elevated position as long as the jack is maintained in its upright position. Before presenting the shoe fully to the operation of the machine, the operator is free to swing the shoe into any convenient position for pulling up the upper material about the heel-seat and the pads 54 act to hold the material in such position as the work progresses.

When the operator is ready to proceed with the operations which are automatically effected by the machine, he will move the jack so as to present the shoe bottom with the mark upon the insole which indicates the forward limit of the heel-seat in registration with the inner wall of the forked slide 62. Upon depressing the starting treadle 77, the anvil 64 is brought into its operative position, as shown in Figs. 11 and 13, and the operator may settle the shoe firmly with the root of its insole rib in contact with the end face of the operative fork of the anvil. The other fork of the anvil, as shown in Fig. 11, will be positioned above the upper material which has already been secured in a flat position upon the heel-seat in the assembling operation or otherwise. Upon the continued depression of the treadle 77, the starting clutch is tripped and the casing 130 is rocked in a clockwise direction, as seen in Fig. 6, carrying the tack nozzle 132 inwardly in the over-wiping operation, releasing the counter-breaking or creasing tool which is constituted by the forked slide 62, advancing the tack nozzle in its casing, and shearing the upstanding upper material at the inner corner of the operative fork of the anvil 64. In the over-wiping operation, the tack which has previously been delivered to the nozzle 132 is positioned above the over-wiped material, as shown in Fig. 6. At the inner limit of the tack nozzle travel, the driver bar 134 is tripped and the tack driven through the over-wiped material, as indicated in Fig. 6. Immediately thereafter, the lever 157 is tripped and the slide 62 is driven downwardly so that its counter-breaking or creasing end shapes the marginal upper material, including the stiff flange of the counter, into exact conformity with the insole and the insole rib as positioned by the anvil 64. The marginal upper material is thus accurately over-wiped and fastened in place up to the point of juncture between the heel-seat and the shank of the shoe, whereas the upper marginal material in the shank in advance of the juncture is separated from the over-wiped portion and shaped most advantageously for the ensuing welt sewing operation.

In the continued cycle of the machine, the tack nozzle 132 is lifted out of contact with the work and the casing 130 is rocked in a counter clockwise direction, carrying the nozzle back to its initial position and retracting the slide 62. During this portion of the cycle a new tack is supplied by the movement of the separator slide 176 and when the treadle 77 returns to its initial position the anvil 64 is lifted to its initial position by the breaking of the toggle links which have hitherto positively positioned it.

The operator may now swing the shoe through 180° and similarly present the other side thereof to the action of the machine, the jack meanwhile being maintained in its elevated position. Finally, upon the completion of the second side of the shoe, the jack is swung outwardly and the post is permitted to drop for the removal of the treated shoe.

Having thus described our invention, what we claim as new and desire to secure by Letters Patent is:

1. In a machine of the class described, means for engaging and compressing into an upstanding rib the marginal upper material at the heel-seat of a pulled-over shoe, together with means for severing said rib at a predetermined point while so compressed.

2. In a machine of the class described, means for engaging the insole of a shoe adjacent to the rib thereof, cooperating means for pressing the marginal upper material into an upright position against the rib of the insole, and means for slitting the material while so held 3. In a machine of the class described, means for holding in an upright position the marginal upper material of a shoe adjacent to the heel-seat thereof, and means for separating the material so held into an upstanding rib and an inturned flange.

4. In a machine of the class described, means for holding in upright position the marginal upper material of a shoe adjacent to the heel-seat thereof, and a driver nozzle movable to separate the material so held into an upright rib and an inturned flange and to position a tack over said flange.

5. In a machine of the class described, a positively-positioned member and a yieldingly positioned member arranged to grip between them the upstanding marginal upper material in the heel-seat portion of a shoe, and means movable to shear the gripped material against said positively-positioned member and to place a tack for fastening the severed material.

6. In a machine of the class described, a positively-positioned member and a yieldingly-positioned member arranged to grip between them the upstanding marginal upper material in the heel-seat portion of a shoe, and a tack nozzle movable to shear the gripped material in cooperation with said positively-positioned member, to wipe the severed material into a flat condition and to position a tack upon the same.

7. In a machine of the class described, an anvil for engaging the insole of a shoe adjacent to the rib thereof, a cooperating member arranged to grip the margin of the upper material, including the counter, against said anvil, and an inwardly-moving cutter for transversely severing the gripped material and wiping the severed portion inwardly upon the heel-seat.

8. In a machine of the class described, an anvil for engaging and supporting an insole rib from its inner side, a counter-breaking member located oppositely thereto and arranged to engage the marginal upper material, and means for driving said member toward the root of the insole rib to form a defined angle in the counter.

9. In a machine of the class described, an anvil having a rib-supporting surface, a slide having an oppositely-disposed work-engaging surface, being movable in an inclined path and yieldingly urged toward the anvil, and a spring actuator for driving said slide against work interposed between it and the anvil.

10. In a machine of the class described, an anvil, a slide arranged to engage the marginal upper material of a shoe opposite to said anvil, means for positively determining the initial point of nearest approach of the slide to said anvil, said means being automatically movable to permit the slide to engage said material in a yielding manner, and means for thereafter imparting a blow to said slide to drive it against said material.

11. In a machine of the class described, a jack for supporting a shoe to be treated, an anvil having a face engaging the inner side of the insole rib thereof, and a counter-breaking tool arranged to be first positioned against the marginal upper stock and then advanced with impact to break the counter into a vertex against the outer side of the supported insole rib.

12. In a machine of the class described, a support for an inverted shoe, an anvil against which the inner side of the insole rib may be firmly held, a counter-breaking tool located opposite thereto and arranged yieldingly to engage the marginal upper stock, and means for imparting a blow to said tool to break the counter into conformity with the outer angle of the insole rib.

13. In a machine of the class described, a support for an inverted shoe, a rigidly-supported anvil adapted to engage the inner side of the insole rib, a counter-breaking tool arranged to clamp the marginal upper material against the rib thus supported, a cutter movable inwardly to sever the clamped rib, and means for imparting a blow to said tool to break the counter into conformity to the outer side of the insole rib adjacent to the point of severance.

14. In a machine of the class described, a support for an inverted shoe, an anvil and a counter-breaking tool arranged to engage and compact the insole rib and adjacent marginal upper material in the heel-seat, a cutter movable to sever said compacted material and to over-wipe the severed portion thereof, means for causing the counter-breaking tool to impart a blow to the unsevered material to break the counter into the insole rib angle, and tack driving means arranged to act upon said over-wiped portion.

15. In a machine of the class described, a support for an inverted shoe, an anvil for supporting the insole rib, a counter-breaking tool oppositely disposed with respect thereto, a tack nozzle movable to shear said rib and the adjacent marginal material in cooperation with said anvil and to over-wipe the severed material, means for actuating said counter-breaking tool, and means for driving a tack from said nozzle through the over-wiped material.

16. In a machine of the class described, a stationary wiper, a swivel support adapted to present an inverted shoe with either side foremost to said wiper, a forked anvil shaped to support the inner side of the insole rib adjacent to the heel-seat, and a cutter arranged to cooperate with either fork of the anvil depending upon the position of the presented shoe.

17. In a machine of the class described, a stationary wiper, a swivel support adapted to present a shoe with either side in advance to said wiper, and a forked counter-breaking tool associated with said wiper and adapted to act with one or the other fork upon the counter according as the shoe is presented with one side or the other in advance.

18. In a machine of the class described, a shoe support, cooperating forked members for clamping the marginal upper material adjacent to the heel-seat, and a cutter movable from between the forks of one member to a similar position between the forks of the other member in severing the material so clamped.

19. In a machine of the class described, a jack for supporting in inverted position a shoe upon a last, means for yieldingly holding the upper material as pulled up about the last, over-wiping means including a tacking nozzle having a cutting element for severing the marginal upper material during the over-wiping movement of the nozzle, and means for driving a tack from said nozzle into the over-wiped material.

20. In a machine of the class described, a support for an inverted shoe, an anvil, toggle links initially supporting the anvil above the insole of the shoe, treadle-operated means for straightening said toggle links to position the anvil upon the insole, a creasing member arranged to be yieldingly pressed against the marginal upper material opposite to said anvil, and means for imparting increased pressure to said member to conform said material to the face of the anvil.

21. In a machine of the class described, a support for an inverted shoe, a toggle-supported anvil initially positioned above the insole, a creasing member arranged to contact with the marginal upper material opposite to said anvil when the latter has been positioned on the insole, power-operated means for thereafter advancing said creasing member, and treadle mechanism acting first to position said anvil upon the insole and then to trip said power-operated means.

22. In a machine of the class described, a support for an inverted shoe, a toggle-supported anvil, treadle-operated mechanism for positioning said anvil upon the insole of the shoe, and power-operated over-wiping means arranged to be set in operation by said treadle-operated mechanism after the anvil has been so positioned.

23. In a machine of the class described, shoe-positioning devices, an initially inoperative anvil, treadle-operated mechanism for positioning said anvil upon the insole of the shoe, a combined tacking and over-wiping device, and power-actuated means therefor arranged to be set in operation by said treadle-operated mechanism after the anvil has been so positioned.

24. In a machine of the class described, shoe-positioning devices, an initially elevated anvil, treadle-operated mechanism for lowering the anvil upon the insole, an oscillatory casing having a combined over-wiping and cutting nozzle carried thereby, and power-actuated means for rocking said casing to effect the over-wiping and cutting operations and for thereafter causing a tack to be driven from said nozzle.

25. In a machine of the class described, a shoe support, a cooperating stationary wiper having a creasing tool movably mounted therein, an oscillatory carrier having a combined wiping and tacking nozzle therein, connections between said carrier and said creasing tool arranged to maintain the latter in a retracted position, and power-operated means for swinging said carrier to move said nozzle for over-wiping the marginal upper material adjacent to the heel-seat of the shoe and through its connections to release said creasing tool for movement against said over-wiped material.

26. In a machine of the class described, a shoe support, an oscillatory carrier, a combined wiping and tacking nozzle mounted on said carrier, means for swinging the carrier to move said nozzle in its over-wiping path, yieldable means for simultaneously moving said nozzle toward the work, and tack-driving mechanism associated with the nozzle.

27. In a machine of the class described, a shoe support, an oscillatory carrier having a longitudinally-movable nozzle and a driver bar therein, spring-actuating mechanism for the driver bar mounted on said carrier, means for swinging said carrier to position the nozzle over a shoe on the support, and means for timing the stroke of the driver bar.

28. In a machine of the class described, a shoe support, a driven cam shaft located above said support, an oscillatory carrier disposed concentrically with respect to said shaft and having a wiping and tacking nozzle and a driver bar therein, means for swinging the carrier to move the nozzle in an over-wiping path upon the marginal upper material of the shoe, and cams on said shaft for longitudinally moving the nozzle and driver bar in timed relation.

29. In a machine of the class described, a shoe support, an oscillatory carrier located above the support and having a wiping and tacking nozzle and a driver therein, an anvil and a creasing tool adjacent to the nozzle, means for swinging the carrier to over-wipe the marginal upper material of the shoe by means of the nozzle and including an adjustable connection for determining the limit of such over-wiping movement, connections between said carrier and creasing tool for positioning the latter, and means for actuating the driver at the conclusion of the over-wiping operation.

30. In a machine of the class described, a shoe support, means for over-wiping the marginal upper material adjacent to the heel-seat of a shoe thereon, a driver bar and a creasing tool, a cam for simultaneously retracting both of said members arranged to release first one and then the other, and separate actuating means therefor operative to effect successively a creasing and a tacking operation.

31. In a machine of the class described, a shoe support, an oscillatory carrier having a longitudinally-movable nozzle therein which is provided with a wiping face, means for swinging the carrier to cause the nozzle to over-wipe the marginal upper material of a shoe upon said support, and means for advancing the nozzle in its carrier during the over-wiping operation.

32. In a machine of the class described, a support for an inverted shoe, an oscillatory carrier disposed above the support and containing a tacking nozzle which has a wiping face and contains a driver bar, means for swinging said carrier to move the wiping face of the nozzle transversely over the shoe bottom and for simultaneously advancing the nozzle in its carrier, and actuating means for the driver bar movable with the carrier and arranged to be brought into action at the conclusion of the wiping operation.

33. In a machine of the class described, a jack, an oscillatory carrier adjacent thereto containing a longitudinally-movable tacking nozzle which has a wiping face, means for swinging the carrier in one direction to move the nozzle over the shoe bottom and over-wipe its marginal upper material, and automatic means for advancing the nozzle in its carrier during the over-wiping operation and for retracting it from contact with the shoe during the reverse movement of the carrier.

34. In a machine of the class described, means for supporting an inverted shoe, an anvil shaped to be positioned against the insole rib thereof, a pair of spaced links connected to the anvil and extending in a direction to take the pull of the shoe against the anvil, mechanism for positioning said anvil, and means for shaping the marginal upper material to the contour of the anvil-supported rib.

35. In a machine of the class described, a jack, an oscillatory nozzle arranged to over-wipe the marginal upper material of a shoe supported thereon in its movement in one direction, a driver carried by said nozzle, tack assorting and delivering mechanism having a flexible connection with said nozzle, a separator plate associated with said mechanism, and a cam-operated element for both rocking the nozzle and moving said separator plate.

36. In a machine of the class described, wiping and tacking instrumentalities, a universally movable jack for presenting a shoe thereto having a longitudinally-movable post initially outwardly-inclined in the machine and free to swing into an upright shoe-presenting position, a cam for moving the post longitudinally and treadle mechanism for operating the cam to elevate the post.

37. In a machine of the class described, wiping and fastening instrumentalities, a jack angularly movable with respect to said instrumentalities, a height stop carried by the jack, a shoe support mounted on the jack and arranged for movement longitudinally thereof, the jack being free to swing into work-presenting position, and treadle-operated mechanism for elevating the shoe support to bring the bottom of a shoe supported thereby into engagement with said height stop.

38. In a machine of the class described, wiping and fastening instrumentalities, and a pivotally-mounted jack arranged to swing from an outwardly-inclined initial position to a substantially upright operative position with respect to said instrumentalities, a swivel shoe support in the jack arranged to be elevated, and means coacting with a treadle for maintaining said support in elevated position while the jack is maintained in substantially its upright position.

39. In a machine of the class described, wiping and fastening devices, and a jack for presenting a shoe thereto including a casing mounted for universal swinging movement, a jack post longitudinally movable therein, elevating mechanism for the post carried by the casing and universally movable therewith, and a treadle mounted independently of the jack and having operative connections with said elevating mechanism.

40. That improvement in the art of shoe-making which consists in supporting the inner side of the insole rib of a pulled-over shoe, yieldingly compacting the over-wiped marginal upper material against the supported rib, and then creasing the compacted material into the angle of the rib by impact.

41. That improvement in the art of shoe-making which consists in pressing into an upstanding assembly the marginal upper material including the counter of a pulled-over shoe, severing the material while so held, fastening the severed portion down upon the insole, and breaking the counter in the unsevered portion by impact into an angle.

42. That improvement in the art of shoe-making which consists in pressing into a compact upstanding rib the marginal upper material adjacent to the heel-seat of a shoe, severing said rib in a direction parallel to the surface of the insole, and fastening down the severed portion thereof.

43. In a machine of the class described, a shoe support, an oscillatory tacking nozzle provided with cutting edges for severing the marginal upper material of a shoe supported thereon, a driver carried by said nozzle, an anvil for supporting the rib of an insole during severing movement of the nozzle across the rib and constructed and arranged to cooperate with said nozzle in severing the rib at a predetermined point longitudinally of the insole, and means for actuating the driver to place a tack in the severed portion of the upper material.

44. In a machine of the class described, a jack, a jack post mounted on the jack and having a shoe support, said jack post being arranged for movement longitudinally of the jack, a treadle, means mounted upon the jack post and coacting with the treadle for elevating the shoe support to shoe-presenting position, adjustable means mounted on the jack for determining the height to which the shoe support is elevated, and means for maintaining said shoe support in elevated position during operations on a shoe.

45. In a machine of the class described, a shoe support, an oscillatory casing provided with a guideway, an elongated nozzle having a wiping face mounted in, and arranged for movement longitudinally of, the guideway, means for yieldingly actuating said nozzle including a cam lever pivoted on said casing, and power-operated means for oscillating the casing in timed relation to said nozzle-actuating means.

In testimony whereof we have signed our names to this specification.

GEORGE GODDU.
LESTER S. MACDONALD.